United States Patent [19]

Haas et al.

[11] Patent Number: 4,977,194
[45] Date of Patent: Dec. 11, 1990

[54] PROCESS FOR THE PREPARATION OF POLYURETHANE FOAMS

[75] Inventors: Peter Haas, Haan; Hans Hettel, Roesrath-Forsbach, both of Fed. Rep. of Germany

[73] Assignee: Bayer Aktiengesellschaft, Leverkusen, Fed. Rep. of Germany

[21] Appl. No.: 393,432

[22] Filed: Aug. 11, 1989

[30] Foreign Application Priority Data

Aug. 23, 1988 [DE] Fed. Rep. of Germany ....... 3828544

[51] Int. Cl.$^5$ .............................................. C08G 18/14
[52] U.S. Cl. ...................................... 521/99; 521/106; 521/120; 521/123; 521/128
[58] Field of Search ................. 521/99, 106, 120, 123, 521/128

[56] References Cited

FOREIGN PATENT DOCUMENTS 2168706 6/1986 United Kingdom .

*Primary Examiner*—Maurice J. Welsh
*Attorney, Agent, or Firm*—Joseph C. Gil; Richard E. L. Henderson

[57] ABSTRACT

The present invention relates to a process for the preparation of polyurethane foams comprising reacting polyisocyanates with dispersions of (i) polymer-containing relatively high molecular weight hydroxyl compounds that are prepared by reaction of mono- or polyisocyanates with NH-containing compounds selected from the group consisting of polyamines containing primary and/or secondary amino groups, hydrazines, hydrazides, and alkanolamines in (ii) a compound containing 1 to about 8 primary and/or secondary hydroxyl groups and having a molecular weight of about 400 to about 16,000, in the presence of water and/or organic blowing agents; catalysts; and flameproofing agents comprising an expandable graphite modified by inorganic expandable materials, alone or in combination with inorganic co-flameproofing agents.

24 Claims, No Drawings

PROCESS FOR THE PREPARATION OF POLYURETHANE FOAMS

BACKGROUND OF THE INVENTION

This invention relates to a process for the preparation of polyurethane foams having improved flame properties based on dispersions containing polymer-containing relatively high molecular weight hydroxyl compounds, in which the flameproofing agent is an expandable graphite used alone or in combination with an inorganic co-flameproofing agent.

Many attempts have been made to make polyurethane foams based on polyether polyols and polyester polyols flame-resistant. Various phosphoric acid esters, as well as metal oxides, have been used for this purpose. British Pat. No. 2,168,706 proposes expandable graphite as a flameproofing agent for polyurethane polyether foams. However, the use of expandable graphite has the disadvantage of a strong wick effect attributable to the graphite component, which leads to continued burning; serious fly-ash formation and, in some cases, incandescent soot formation; and finely powdered cinders that turn very easily into dust.

It has now surprisingly been found that these disadvantages, which are an obstacle to commercial use, do not occur when expandable graphite is used as a flameproofing agent in polyurethane foams based on dispersions of polymer-containing, relatively high molecular weight hydroxyl compounds.

Foams according to the invention exhibit advantageous results upon exposure to flame when compared to polyurethane ether foams as described in British Pat. No. 2,168,706. Even when used alone, but especially when used in combination with inorganic flame-resistant additives, expandable graphite used according to the invention produces foams exhibiting no wick effect produced by the graphite, no fly-ash formation, and no finely powdered cinders, but instead produces foams that are highly carbonizing, self-extinguishing, and non-dripping. The advantages of the invention can be demonstrated by a number of widely applied flameproofing standards, including, for example, BS 5852, Part 2 Crib 5 Test; DIN 4102 MVSS; and UL 94.

SUMMARY OF THE INVENTION

The present invention relates to a process for the preparation of polyurethane foams comprising reacting (1) polyisocyanates;

with (2) dispersions of (i) polymer-containing relatively high molecular weight hydroxyl compounds, said polymer-containing hydroxyl compounds being prepared by reaction of monoisocyanates or polyisocyanates with one or more NH-containing compounds selected from the group consisting of polyamines containing primary and/or secondary amino groups, hydrazines, hydrazides, and alkanolamines, in (ii) a compound containing 1 to about 8 primary and/or secondary hydroxyl groups and having a molecular weight of about 400 to about 16,000;

in the presence of (3) water, organic blowing agents, or combinations thereof;

(4) catalysts; and (5) flameproofing agents comprising (a) about 1 to about 35 parts by weight (preferably 1 to 30 parts by weight and more preferably 2.5 to 20 parts by weight), based on 100 parts by weight of dispersion (2), of an expandable graphite modified by inorganic expandable materials, and (b) up to about 35 parts by weight (preferably 1 to 35 parts by weight, more preferably 1 to 30 parts by weight, and most preferably 2.5 to 20 parts by weight), based on 100 parts by weight of dispersion (2), of inorganic co-flameproofing agents;

and, optionally, in the further presence of (6) compounds containing at least two isocyanate-reactive hydrogen atoms and having a molecular weight of from about 32 to about 399; and (7) known surface-active additives and other known auxiliaries.

DESCRIPTION OF THE INVENTION

Preferred embodiments of the process according to the invention have one or more of the following characteristics:

(a) a sulfate-containing expanded graphite having a sulfate content of 1% to 40% by weight (preferably 1% to 30% by weight and more preferably 5% to 20% by weight) is used as the flameproofing agent;

(b) ammonium polyphosphate is used as the co-flameproofing agent;

(c) nitrolime is used as the co-flameproofing agent;

(d) aluminum oxide hydrate is used as the co-flameproofing agent;

(e) calcium carbonate is used as the co-flameproofing agent;

(f) an equivalent ratio (NCO:NH) between the monoisocyanates or polyisocyanates and the NH-containing compounds (polyamines containing primary and/or secondary amino groups, hydrazines, or hydrazides) of from 0.8 to 1.05 is used in the preparation of the dispersion;

(g) the dispersions of polymer-containing relatively high molecular weight hydroxyl compounds are preapred by reaction of mixtures of (A) organic polyisocyanates, (B) polyamines containing primary and/or secondary amino groups, hydrazines, or hydrazides, and (C) polyethers containing at least one hydroxyl group and having a molecular weight of 2,000 to 16,000, wherein the components (A), (B), and (C) are continuously introduced, either separately or with components (B) and (C) having been previously combined, at an equivalent ratio for components (A) and (B) of from 0.8 to 1.05, into a flow mixer for a residence time of less than 10 minutes, optionally with heating at 50 to 150°C., and optionally with stirring after exiting from the flow mixer.

(h) distilled tolylene diisocyanate is used as the polyisocyanate; and the dispersions of polymer-containing relatively high molecular weight hydroxyl compounds used are obtained by reaction of hydrazine derivatives or adducts corresponding to the formula

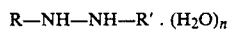

R—NH—NH—R' . (H$_2$O)$_n$ wherein R and R' are independently hydrogen, alkyl, cycloalkyl, aryl, aralkyl, or acyl groups and n is 0 or 1, with polyisocyanates in a polyether containing at least two hydroxyl groups and having a molecular weight of about 1,500 to about 10,000, wherein at least 10% by weight of the hydroxyl groups present are primary hydroxyl groups;

(i) the polyisocyanates used are mixtures of tolylene diisocyanate with aliphatic, cycloaliphatic, or other aromatic polyisocyanates in quantities of less than 50% by weight of the total quantity of polyisocyanates.

The Examples of British Pat. No. 2,168,706 illustrate the serious disadvantage of a strong wick effect caused by the expanded graphite component, as reflected in continued burning and the formation of completely unbound cinders as an extremely fine ash. However, it has surprisingly been found that when polyurethane foams are prepared according to this invention, excellently carbonizing, coherent, flame-resistant, self-extinguishing, difficultly ignited products are obtained, particularly where phosphorus-containing inorganic additives are used. Moreover, it has previously been necessary to use quantities of 30 parts by weight of the individual components. The small quantity of active substance required to obtain effective flameproofing according to this invention is another advantage.

Suitable starting components for the preparation of the polyurethane foams include the following:

1. Aliphatic, cycloaliphatic, araliphatic, aromatic, and heterocyclic polyisocyanates of the type described, for example, by W, Siefken in *Justus Liebigs Annalen der Chemie*, 562, pages 75 to 136, for example, those corresponding to the formula Q(NCO)$_n$ wherein
n is 2–4 (preferably 2); and
Q is an aliphatic hydrocarbon group containing about 2 to about 18 (preferably 6 to 10) carbon atoms, a cycloaliphatic hydrocarbon group containing about 4 to about 15 (preferably 5 to 10) carbon atoms, an aromatic hydrocarbon group containing about 6 to about 15 (preferably 6 to 13) carbon atoms, or an araliphatic hydrocarbon group containing about 8 to about 15 (preferably 8 to 13) carbon atoms.

Examples of such polyisocyanates are described in German Offenlegungsschrift No. 2,832,253, pages 10–11.

In general, it is particularly preferred to use commercially available polyisocyanates, such as, for example, 2,4- and 2,6-tolylene diisocyanate and mixtures of these isomers ("TDI"); polyphenyl polymethylene polyisocyanates of the type obtained by phosgenation of anilineformaldehyde condensates ("crude MDI"); and polyisocyanates containing carbodiimide groups, urethane groups, allophanate groups, isocyanurate groups, urea groups, or biuret groups ("modified polyisocyanates"), more especially those modified polyisocyanates which are derived from 2,4-and/or 2,6-tolylene diisocyanate and from 4,4'- and/or 2,4'-diphenylmethane diisocyanate.

2. Dispersions of polymer-containing, relatively high molecular weight hydroxyl compounds obtained by reaction of mono- and/or polyisocyanates with NH-containing compounds selected from the group consisting of polyamines containing primary and/or secondary amino groups, hydrazines, hydrazides, and alkanolamines in a compound containing 1 to about 8 primary and/or secondary hydroxyl groups and having a molecular weight of about 400 to about 16,000. Dispersions such as these, containing polymer-containing relatively high molecular weight hydroxyl compounds, are known, for example, from German Auslegeschrift No. 2,519,004; German Offenlegungsschriften No. 2,550,796, 2,550,797, 2,550,860, 2,550,833, 2,550,862, 2,638,759, and 2,639,254; U.S. Pat. Nos. 4,374,209 and 4,381,351; and European Pat. application No. 079,115.

As described above, preferred dispersions can be prepared by reaction of mixtures of (A) organic polyisocyanates, (B) polyamines containing primary and/or secondary amino groups, hydrazines, or hydrazides, and (C) polyethers containing hydroxyl groups at an NCO:NH equivalent ratio of components (A) and (B) of from 0.8 to 1.05. In general, isocyanates (A) would be expected to react more rapidly with NH groups (e.g., of component (B)) than with OH groups (e.g., of component (C)). Thus, the dispersions are essentially mixtures of polymeric reaction products in hydroxyl-containing polyethers that, depending on the ratios of reaction components, may themselves be partially reacted.

It is of course also possible to use polymer-modified polyols of the type obtained by grafting monomers containing double bonds (such as styrene and acrylonitrile) onto polyols.

3. Water (preferred), readily volatile organic substances, or a mixture thereof as blowing agents.

4. Catalysts known for use in polyurethane chemistry, such as tertiary amines and organometallic compounds.

5. Expandable graphite (also known as expanded graphite) as flameproofing agent, either by itself or, preferably, together with an inorganic co-flameproofing agent.

Preferred expandable graphites according to the invention include those modified with sulfuric acid and generally having a bound sulfate content between about 5 and about 20% by weight, depending on the production process. Other less preferred expansion components, such as nitrate and fluoride, may be incorporated into the graphite structure.

Preferred co-flameproofing agents include ammonium polyphosphates having various degrees of condensation, oligophosphates having various cationic constituents, nitrolime, lime, aluminum oxides, aluminum oxide hydrates, and boron oxides. However, it is also possible to use components rich in nitrogen, such as urea, melamine, melamine derivatives, melamine salts, cyanamide, and dicyanodiamide.

6. Optionally, compounds containing at least two isocyanate-reactive hydrogen atoms and having a molecular weight of about 32 to about 399. Such compounds include compounds containing hydroxyl groups, amino groups, thiol groups, carboxyl groups or combinations thereof (preferably compounds containing hydroxyl groups and/or amino groups) which serve as chain-extending agents or crosslinking agents. Suitable compounds of this type generally contain about 2 to about 8 (preferably 2 to 4) isocyanate-reactive hydrogen atoms. Examples are described in German Offenlegungsschrift No. 2,832,253, pages 19 to 20.

7. Optionally, surface-active additives, such as emulsifiers and foam stabilizers. Preferred emulsifiers include those based on alkoxylated fatty acids and higher alcohols. Preferred foam stabilizers include polyether siloxanes, particularly water-soluble types, generally having structures in which a copolymer of ethylene oxide and propylene oxide is attached to a polydimethylsiloxane group. Foam stabilizers such as these are described, for example, in U.S. Pat. Nos. 2,834,748, 2,917,480 and 3,629,308.

It is also possible to use reaction retarders, including substances exhibiting acidic characteristics, such as hydrochloric acid and organic acid halides; cell regulators, such as paraffins, fatty alcohols, and dimethylpolysiloxanes; pigments or dyes; stabilizers against the effects of aging and weather; plasticizers; fungistatic and bacteriostatic agents; and fillers, such as barium sulfate, kieselguhr, carbon black, and whiting.

Further examples of suitable surface-active additives and foam stabilizers, cell regulators, reaction retarders, stabilizers, flameproofing agents, plasticizers, dyes, fillers, fungistatic and bacteriostatic agents, as well as information on the use and mechanism of action of these additives, can be found in Kunststoff Handbuch, Vol. VII, edited by Vieweg and Höchtlen, Carl-Hanser-Verlag, Munich 1966, for example, on pages 103 to 113.

In the process according to the invention, the reaction components are reacted by the known one-shot process, prepolymer process, or semiprepolymer process. These processes can often be carried using machines, such as, for example, the type described in U.S. Pat. No. 2,764,565. Information on processing machines which may also be used in accordance with the invention can be found in Kunststoff-Handbuch, Vol. VII, edited by Vieweg and Höchtlen, Carl-Hanser-Verlag, Munich 1966, for example, on pages 121 to 205.

In the preparation of foams according to the invention, the foaming reaction may also be carried out in closed molds by introducing the reaction mixture into an appropriate mold. Suitable mold materials include metals, such as aluminum, or plastics, such as epoxy resins. The foamable reaction mixture foams in the mold, thereby forming the molding. Foaming in a mold may be carried out in such a way that the molding has a cellular structure at its surface. However, foaming may also be carried out in such a way that the molding has a compact skin and a cellular core. When foaming in a mold, it is possible to introduce foamable reaction mixture into the mold in such a quantity that the foam formed just fills the mold. However, it is also possible to introduce more foamable reaction mixture into the mold than is necessary for filling the interior of the mold with foam, a technique known as overcharging and described, for example, in U.S. Pat. Nos. 3,178,490 and 3,182,104.

Known "external" release agents, such as silicone oils, are often used in in-mold foaming. However, it is also possible to use so-called "internal" release agents (optionally in admixture with external release agents) of the type known for example from German Offenlengungsschriften No. 2,121,670 and 2,307,589.

It is also possible to produce foams by slabstock foaming or by the known laminator process.

The products obtainable by the process of the invention are used in applications requiring high flame resistance for polyurethane foams, including, for example, the manufacture of seating for use where safety requirements are stringent (such as in theaters, cinemas, and restaurants) and the production of mattresses with improved flameproof properties as required by BS 5852, Part 2, and the ignition sources specified therein.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The components used in the following examples (the parts shown are parts by weight) were reacted under the conditions typically used for the production of polyether polyurethane urea foams.

EXAMPLE 1

100 parts polyurea dispersion (solids content 10% by weight) based on 90% by weight of an acti polyether polyol of trimethylolpropane, propylene oxide, (85% by weight) and (terminal) ethylene oxide (15% by weight), and 3% by weight of hydrazine and 7% by weight of tolylene diisocyanate, CH value 32
2.5 parts water
2 parts diethanolamine
0.44 part amine crosslinker based on a higher alkanolamine
0.2 part activator Dabco 33LV (Houdry/Hüls) (solution of triethylenediamine in dipropylene glycol)
0.2 part activator Al (Union Carbide Corp.) (bis(2-dimethylaminoethyl) ether)
0.5 part silicone stabilizer AC 3367 based on a silicone modified with a short-chain polyether
0.2 part tin di-2-ethylhexoete
2 parts tris(2chloroethyl) phosphate
20 parts expanded graphite GHS type 3 (Sigri GmbH D-8901 Meitingen), sulfate content approx. 14% by weight
39.4 parts mixture of 80% by weight 2,4-tolylene diisocyanate and 20% by weight 2,6-tolylene diisocyanate
Cream time: 8 seconds
Rise time: 110 seconds
Flammability test according to BS 5852, Part 2, Crib 5
  Burning time: 4.5 mins, identical with that of the crib
  Crater depth: 5 cm
  Area burnt: 200 cm$^2$

EXAMPLE 2 (Comparison Example)

100 parts filler-free polyol based on trimethylolpropane, propylene oxide (85% by weight) and (terminal) ethylene oxide (15% by weight) containing at least 50% primary CH groups, CH value 28
2.5 parts water
2.0 parts silicone stabilizer OS 20 (Bayer AG) based on a silicone modified with a long-chain polyether
0.6 part activator AI (Union Carbide Co.) (bis(2-dimethylaminoethyl) ether)
0.1 part tin di-2-ethylhexoate
20 parts expanded graphite GHS Type 3 (Sigri GmbH D-8901 Meitingen), sulfate content approx. 14% by weight
33.8 parts mixture of 80% by weight 2,4-tolylene diisocyanate and 20% by weight 2,6-tolylene diisocyanate
Cream time: 8 seconds
Rise time: 75 seconds
Flammability test according to BS 5852, Part 2, Crib 5
  Burning time: The flame was extinguished after only 6 minutes because of excessive propagation. By this time, an area as large as 400 cm$^2$ had been burnt.

EXAMPLE 3

100 parts same polyurea dispersion as in Example 1
2.5 parts water
2 parts diethanolamine
0.44 part same amine crosslinker as in Example 1
0.2 part same activator Al as in Example 1
0.5 part same stabilizer as in Example 1

0.2 part tin di-2-ethylhexoate
0.2 part tris(2-chloroethyl) phosphate
20 parts expanded graphite GHS Type 3 (Sigri GmbH D-8901 Meitingen), sulfate content approx. 14% by weight
63.8 parts a polymeric diphenylmethane polyisocyanate having an NCO content of 30% by weight
Cream time: 10 seconds
Rise time: 115 seconds
Flammability test according to BS 5852, Part 2, Crib 5

Burning time: 4.5 minutes
Crater depth: 3.5 cm
Area burnt: 120 cm$^2$

EXAMPLE 4

100 parts same polyurea dispersion as in Example 1
3.0 parts water
0.25 part same stabilizer as in Example 1
1.0 part diethanolamine
0.66 part same amine crosslinker as in Example 1
0.25 part same activator Dabco 33LV as in Example 1
0.15 part tin di-2-ethyhexoate
2.0 parts tris(2-chloroethyl) phosphate
10 parts expanded graphite GHS Type 3 (Sigri GmbH D-8901 Meitingen), sulfate content approx. 14% by weight
20 parts ammonium polyphosphate (Exolit 422, a product of Hoechst AG)
4.0 parts calcium hydroxide
40.6 parts mixture of 80% by weight 2,4-tolylene diisocyanate and 20% by weight 2,6-tolylene diisocyanate
Flammability test according to BS 5852, Part 2, Crib 5
  Fabric: PE covering manufactured by Lister (GB), 220 g/m$_2$
  Burning time: 4.5 minutes
  Crater depth: 5 cm; the burnt area is compactly carbonized
  Weight loss: 40 g
Foam properties:
  Gross density: 35.5 kg/m$_3$
  Tensile strength: 80 KPa
  Elongation at break: 64%
  Compression hardness: 3.1 KPa
  Compression set: 5.7%

EXAMPLE 5

100 parts same polyurea dispersion as in Example 1
3 parts water
3.0 parts diethanolamine
0.4 part same amine crosslinker as in Example 1
0.3 part same activator Dabco 33LV as in Example 1
0.4 part same activator Al as in Example 1
0.8 part same stabilizer as in Example 1
0.5 part tin di-2-ethylhexoate
2.0 parts tris(2-chloroethyl) phosphate
10 parts expanded graphite GHS Type 3 (Sigri GmbH, D-8901 Meitingen), sulfate content approx. 14% by weight
30 parts ammonium polyphosphate (Exolit 422, a product of Hoechst AG)
44.6 parts mixture of 80% by weight 2,4-tolylene diisocyanate and 20% by weight 2,6-tolylene diisocyanate
Cream time: 8 seconds
Rise time: 125 seconds
Flammability test according to BS 5852, Part 2, Crib 5
  Burning time: 3.0 minutes
  Crater depth: 5 cm; the base area is not damaged, the burnt area is compactly carbonized
  Weight loss: 35 g
Foam properties:
  Gross density: 37.5 kg/m$^3$
  Tensile strength: 80 KPa
  Elongation at break: 65%
  Compression hardness: 3.8 KPa
  Compression set: 5.8%

EXAMPLE 6

100 parts same polyurea dispersion as in Example 1
3.0 parts water
2.0 parts diethanolamine
0.44 part same amine crosslinker as in Example 1
0.2 part same activator AI as in Example 1
0.2 part same activator Dabco 33LV as in Example 1
2.0 parts tris(2-chloroethyl) phosphate
0.3 part tin di-2-ethylhexoate
20 parts expanded graphite GHS Type 3 (Sigri GmbH, D-8901 Meitingen), sulfate content approx. 14% by weight
20 parts melamine
42 parts mixture of 80% by weight 2,4-tolylene diisocyanate and 20% by weight 2,6-tolylene diisocyanate
Cream time: 8 seconds
Rise time: 105 seconds
Flammability test according to BS 5852, Part 2, Crib 5
  Burning time: 3 minutes
  Crater depth: 4 cm; the lower-lying foam is not damaged

EXAMPLE 7

100 parts same polyurea dispersion as in Example 1
3 parts water
2 parts diethanolamine
0.44 part same amine crosslinker as in Example 1
0.2 part same activator Dabco 33LV as in Example 1
0.2 part same activator AI as in Example 1
0.5 part same stabilizer as in Example 1
2 parts tris(2-chloroethyl) phosphate
0.3 part tin di-2-ethylhexoate
20 parts expanded graphite GHS Type 3 (Sigri GmbH D-8901 Meitingen), sulfate content approx. 14% by weight
20 parts aluminum oxide hydrate (Martinal, a product of Martinswerk GmbH Bergheim, D-5010)
42 parts mixture of 80 by weight 2,4-tolylene diisocyanate and 20% by weight 2,6-tolylene diisocyanate
Cream time: 8 seconds
Rise time: 105 seconds
Flammability test according to BS 5852, Part 2, Crib 5
  Fire time: 4 minutes
  Crater depth: 4 cm; the lower-lying foam is not destroyed
  Weight loss: 40 g
Foam properties:
  Gross density: 33.8 kg/m$^3$
  Tensile strength: 90 KPa
  Elongation at break: 130%
  Compression hardness: 3.2 KPa
  Compression set: 4.5%

The Examples show that the undesirable wick effect, which results in continued burning of the foam after the crib burning time, is reduced and burning behavior is considerably improved through the use of the polyol component based on the polyurea dispersion.

What is claimed is:

1. A process for the preparation of a polyurethane foam comprising reacting
   (1) a polyisocyanate;
with
   (2) a dispersion of (i) a polymer-containing relatively high molecular weight hydroxyl compound, said polymer-containing hydroxyl compounds being prepared by reaction of a monoisocyanate or a polyisocyanate with one or more NH-containing compounds selected from the group consisting of a polyamine containing primary and/or secondary amino groups, a hydrazine, a hydrazide, and an alkanolamine, in (ii) a compound containing 1 to about 8 primary and/or secondary hydroxyl groups and having a molecular weight of about 400 to about 16,000;
in the presence of
   (3) water, an organic blowing agent, or a combination thereof;
   (4) a catalyst; and
   (5) a flameproofing agent comprising
      (a) about 1 to about 35 parts by weight, based on 100 parts by weight of dispersion (2), of an expandable graphite modified by an inorganic expandable material, and
      (b) up to about 35 parts by weight, based on 100 parts by weight of dispersion (2), of an inorganic co-flameproofing agent.

2. A process according to claim 1 carried out in the further presence of
   (6) a compound containing at least two isocyanate-reactive hydrogen atoms and having a molecular weight of from about 32 to about 399.

3. A process according to claim 1 carried out in the further presence of
   (7) a surface-active additive or other auxiliary.

4. A process according to claim 1 wherein the flameproofing agent comprises 1 to 35 parts by weight, based on 100 parts by weight of dispersion (2), of the expandable graphite.

5. A process according to claim 1 wherein the flameproofing agent comprises 1 to 30 parts by weight, based on 100 parts by weight of dispersion (2), of the expandable graphite.

6. A process according to claim 1 wherein the flameproofing agent comprises 2.5 to 20 parts by weight, based on 100 parts by weight of dispersion (2), of the expandable graphite.

7. A process according to claim 1 wherein the flameproofing agent comprises
   (a) 1 to 35 parts by weight, based on 100 parts by weight of dispersion (2), of the expandable graphite, and
   (b) 1 to 35 parts by weight, based on 100 parts by weight of dispersion (2), of the inorganic co-flameproofing agent.

8. A process according to claim 1 wherein the flameproofing agent comprises
   (a) 1 to 35 parts by weight, based on 100 parts by weight of dispersion (2), of the expandable graphite, and
   (b) 1 to 30 parts by weight, based on 100 parts by weight of dispersion (2), of the inorganic co-flameproofing agent.

9. A process according to claim 1 wherein the flameproofing agent comprises
   (a) 1 to 35 parts by weight, based on 100 parts by weight of dispersion (2), of the expandable graphite, and
   (b) 2.5 to 20 parts by weight, based on 100 parts by weight of dispersion (2), of the inorganic co-flameproofing agent.

10. A process according to claim 1 wherein the flameproofing agent comprises
    (a) 2.5 to 20 parts by weight, based on 100 parts by weight of dispersion (2), of an expandable graphite modified by an inorganic expandable material, and
    (b) 2.5 to 20 parts by weight, based on 100 parts by weight of dispersion (2), of an inorganic co-flameproofing agent.

11. A process according to claim 1 wherein the flameproofing agent is a sulfate-containing expanded graphite having a sulfate content of 1% to 40% by weight.

12. A process according to claim 11 wherein the sulfate-containing expanded graphite has a sulfate content of 1% to 30% by weight.

13. A process according to claim 11 wherein the sulfate-containing expanded graphite has a sulfate content of 5% to 20% by weight.

14. A process according to claim 1 wherein the co-flameproofing agent is ammonium polyphosphate, nitrolime, aluminum oxide hydrate, or calcium carbonate.

15. A process according to claim 1 wherein in the preparation of the dispersion (2) the equivalent ratio (NCO:NH) of the monoisocyanate or polyisocyanate to the NH-containing compounds is from 0.8 to 1.05.

16. A process according to claim 1 for the preparation of a polyurethane foam comprising reacting
    (1) a polyisocyanate;
with
    (2) a dispersion of (i) a polymer-containing relatively high molecular weight hydroxyl compound, said polymer-containing hydroxyl compound being prepared by reaction of a monoisocyanate or a polyisocyanate with one or more NH-containing compounds selected from the group consisting of a polyamines containing primary and/or secondary amino groups, a hydrazine, a hydrazide, and an alkanolamine, wherein the equivalent ratio (NCO:NH) of the monoisocyanate or polyisocyanate to the NH-containing compounds is from 0.8 to 1.05, in (ii) a compound containing 1 to about 8 primary and/or secondary hydroxyl groups and having a molecular weight of about 400 to about 16,000;
in the presence of
    (3) water, an organic blowing agent, or a combination thereof;
    (4) a catalyst; and
    (5) a flameproofing agent comprising
       (a) 2.5 to 20 parts by weight, based on 100 parts by weight of dispersion (2), of a sulfate-containing expanded graphite having a sulfate content of 1 to 40% by weight, and
       (b) 2.5 to 20 parts by weight, based on 100 parts by weight of dispersion (2), of ammonium polyphosphate, nitrolime, aluminum oxide hydrate, or calcium carbonate as co-flameproofing agent.

17. A process according to claim 1 for the preparation of a polyurethane foam comprising reacting
    (1) a polyisocyanate;
with
    (2) a dispersion of (i) a polymer-containing relatively high molecular weight hydroxyl compound, said polymer-containing hydroxyl compound being prepared by reaction of a monoisocyanate or a polyisocyanate with one or more NH-containing compounds selected from the group consisting of a polyamine containing primary and/or secondary amino groups, a hydrazine, a hydrazide, and an alkanolamine, wherein the equivalent ratio (NCO:NH) of the monoisocyanate or polyisocyanate to the NH-containing compounds is from 0.8 to 1.05, in (ii) a compound containing 1 to about 8 primary and/or secondary hydroxyl groups and having a molecular weight of about 400 to about 16,000;

in the presence of (3) water, an organic blowing agent, or a combination thereof;

(4) a catalyst;

(5) a flameproofing agent comprising
  (a) 2.5 to 20 parts by weight, based on 100 parts by weight of dispersion (2), of a sulfate-containing expanded graphite having a sulfate content of 1 to 40% by weight, and
  (b) 2.5 to 20 parts by weight, based on 100 parts by weight of dispersion (2), of ammonium polyphosphate, nitrolime, aluminum oxide hydrate, or calcium carbonate as co-flameproofing agent;

(6) a compound containing at least two isocyanate-reactive hydrogen atoms and having a molecular weight of from about 32 to about 399; and (7) a surface-active additive or other auxiliary.

18. A process according to claim 1 wherein component (ii) of the dispersion is a polyether containing at least one hydroxyl group and having a molecular weight of 2,000 to 16,000.

19. A process according to claim 1 wherein the dispersion is prepared by reaction of (A) an organic polyisocyanate.

(B) one or more NH-containing compounds selected from the group consisting of a polyamine containing primary and/or secondary amino groups, a hydrazine, and a hydrazide, and (C) a polyether containing at least one hydroxyl group and having a molecular weight of 2,000 to 16,000, wherein said components (A), (B), and (C) are continuously introduced, either separately or with components (B) and (C) previously combined, at an equivalent ratio for components (A) and (B) of from 0.8 to 1.05, into a flow mixer for a residence time of less than 10 minutes, optionally with heating at 50C. to 150C., and optionally with stirring after exiting from the flow mixer.

20. A process according to claim 1 wherein the polyisocyanate (1) is distilled tolylene diisocyanate.

21. A process according to claim 1 wherein the dispersion is prepared by reaction of an NH-containing compound corresponding to the formula

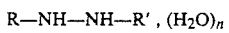

$$R-NH-NH-R', (H_2O)_n$$

wherein R and R' are independently hydrogen, alkyl, cycloalkyl, aryl, aralkyl, or acyl groups and n is 0 or 1, with a polyisocyanate in a polyether containing at least two hydroxyl groups and having a molecular weight of 1,500 to 10,000, wherein at least 10% by weight of the hydroxyl groups present are primary hydroxyl groups.

22. A process according to claim 1 wherein the polyisocyanate (1) is distilled tolylene diisocyanate and the dispersion (2) is prepared by reaction of an NH-containing compound corresponding to the formula

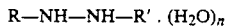

$$R-NH-NH-R'. (H_2O)_n$$

wherein R and R' are independently hydrogen, alkyl, cycloalkyl, aryl, aralkyl, or acyl groups and n is 0 or 1, with a polyisocyanate in a polyether containing at least two hydroxyl groups and having a molecular weight of 1,500 to 10,000, wherein at least 10% by weight of the hydroxyl groups present are primary hydroxyl groups.

23. A process according to claim 21 wherein the polyisocyanate is a mixture of tolylene diisocyanate and an aliphatic, cycloaliphatic, or other aromatic polyisocyanate in quantities of less than 50% by weight of the total quantity of polyisocyanates.

24. A polyurethane foam prepared by the process of claim 1.

* * * * *